United States Patent
Feldman et al.

(10) Patent No.: US 7,652,674 B2
(45) Date of Patent: Jan. 26, 2010

(54) ON THE FLY HARDWARE BASED INTERDIGITATION

(75) Inventors: Mark Feldman, Walnut Creek, CA (US); Bob Akka, Sausalito, CA (US)

(73) Assignee: Real D, Beverly Hills, CA (US)

( * ) Notice: Subject to any disclaimer, the term of this patent is extended or adjusted under 35 U.S.C. 154(b) by 272 days.

(21) Appl. No.: 11/350,534

(22) Filed: Feb. 9, 2006

(65) Prior Publication Data

US 2007/0182738 A1 Aug. 9, 2007

(51) Int. Cl.
*G09G 5/00* (2006.01)
*G09G 5/02* (2006.01)
*G06T 15/20* (2006.01)
*H04N 13/04* (2006.01)
*H04N 15/00* (2006.01)
*H04N 9/47* (2006.01)
*G06K 9/40* (2006.01)

(52) U.S. Cl. .................... 345/582; 348/51; 348/59; 348/42; 345/586; 345/606; 345/613; 345/552; 382/254; 382/300

(58) Field of Classification Search ............ 345/4, 345/6, 22, 63, 85, 419, 427, 581–582, 589, 345/612, 613, 660, 673, 639, 643, 586, 606, 345/657, 690, 565, 538, 548, 549, 552; 348/51–52, 348/59, 39–42, 270, 273, 739–743, 564; 382/162–167, 254, 274, 276, 282, 293, 298, 382/300, 305, 285, 260

See application file for complete search history.

(56) References Cited

U.S. PATENT DOCUMENTS

| | | | | |
|---|---|---|---|---|
| 3,409,351 | A | | 11/1968 | Winnek |
| 5,311,329 | A | * | 5/1994 | Haeberli et al. ............. 358/448 |
| 5,438,429 | A | * | 8/1995 | Haeberli et al. ............. 358/445 |
| 5,808,732 | A | * | 9/1998 | Williams ............... 356/139.01 |
| 6,091,482 | A | * | 7/2000 | Carter et al. .................. 355/79 |
| 6,366,281 | B1 | | 4/2002 | Lipton et al. |
| 6,519,088 | B1 | | 2/2003 | Lipton |
| 2002/0011969 | A1 | * | 1/2002 | Lipton et al. .................... 345/8 |
| 2004/0100464 | A1 | * | 5/2004 | Oh et al. ....................... 345/419 |
| 2005/0059487 | A1 | * | 3/2005 | Wilder et al. ................. 463/32 |
| 2005/0122395 | A1 | * | 6/2005 | Lipton et al. .................. 348/59 |
| 2005/0195276 | A1 | * | 9/2005 | Lipton et al. .................. 348/59 |
| 2006/0012878 | A1 | | 1/2006 | Lipton et al. |
| 2006/0279580 | A1 | * | 12/2006 | Akka et al. ................. 345/582 |
| 2006/0284974 | A1 | * | 12/2006 | Lipton et al. .................. 348/59 |
| 2007/0177007 | A1 | * | 8/2007 | Lipton et al. .................. 348/51 |

(Continued)

OTHER PUBLICATIONS

Feldman, Mark H et al. "Interactive 2D to 3D stereoscopic image synthesis" In Proceedings SPIE. vol. SPIE-5664, pp. 186-197. Published in 2005.

(Continued)

*Primary Examiner*—Wesner Sajous
(74) *Attorney, Agent, or Firm*—Baker & McKenzie LLP

(57) ABSTRACT

A method of interdigitation for display of an autostereoscopic source image to a screen comprising a plurality of pixels having sub-pixels and sub-pixel components and apparatus for interdigitation is provided. The method comprises generating a texture memory coordinate at each pixel location on the screen of the source image, calculating screen pixel location based on the texture memory coordinate of each pixel, computing view numbers based on screen pixel location, wherein view numbers comprise one value for each sub-pixel component, mapping proportional pixel locations in tiles from multiple tile perspective views of the autostereoscopic image to a resultant image using the view numbers, and extracting one subpixel component from each proportional pixel location to represent color for the pixel in the resultant image.

30 Claims, 6 Drawing Sheets

OTHER PUBLICATIONS

Citation to establish publication date for Feldman, Mark H et al. "Interactive 2D to 3D stereoscopic image synthesis" In Proceedings SPIE. vol. SPIE-5664, pp, 186-197. 2005.

Feldman, Mark H. et al, "Interactive 2D to 3D Stereoscopic Image Synthesis." In Proceedings SPIE. vol. SPIE-5664, pp. 186-197. Published in 2005.

International search report and written opinion of international searching authority in co-pending PCT/US07/003809.

International preliminary report on patentability with written opinion of international searching authority in co-pending PCT/US07/003809.

* cited by examiner

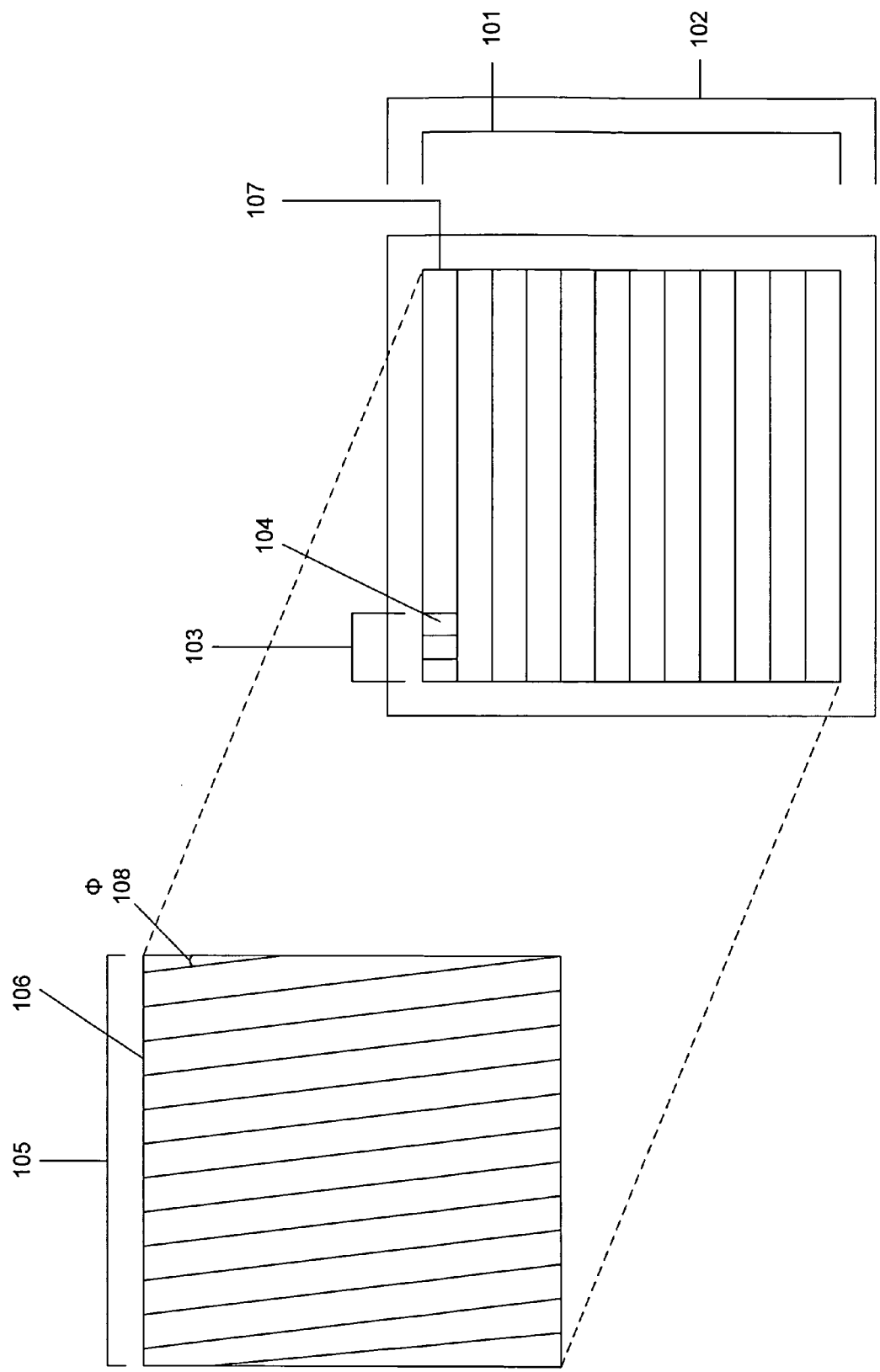

ON THE FLY HARDWARE BASED INTERDIGITATION

BACKGROUND OF THE INVENTION

1. Field of the Invention

The present invention generally relates to display devices capable of interdigitation, and more specifically to computer architectures for projection devices performing stereo view interdigitation.

2. Description of the Related Art

Autostereoscopic displays provide a user or viewer with a three dimensional image without the need for polarizing eyewear or other viewing equipment. Lenticules are generally long, relatively thin lenses, sometimes formed into an array, wherein each viewing point, such as each viewer's eye, focuses on a different lenticule or thin lens in the array. Lenticular-based autostereoscopic displays, such as StereoGraphics' SynthaGram™, present the user with a realistic stereoscopic visual scene representation by displaying multiple perspective views. The user's eyes see a pair of images from the array of perspective views and a stereoscopic image is formed in the user's mind.

The SynthaGram™ display utilizes a lenticular lens array, precisely positioned on top of a flat panel digital color display (e.g. LCD or plasma) and used to optically separate views combined in the displayed image. This combination process is known as interdigitation or Interzigging™, and is a precise mapping of input perspective views to output subpixel components that takes into account the physical properties of the lenticular array and its alignment with the display. The input perspective views are assumed to be created in a digital format, properly composed, aligned, balanced, having appropriate parallax, and each view is of the same horizontal and vertical pixel dimensions. Creation of the perspective views is computationally challenging, and perspective views can be created by various techniques including photography methods and computer graphics software processing.

Display pixels are composed of a set of adjacent subpixels, typically organized in a red-green-blue pattern. The subpixels are assumed herein to be truly adjacent, however the reality is that a small "grout" boundary surrounds each subpixel. Interdigitation mapping represents a relatively accurate or correct assignment of subpixels in the perspective views to subpixel elements in the display. The mapping is uniquely based on the size and physical properties of the lenticular lens sheet. Such properties include the linear density (or a related representation such as pitch) of the lenticules on the sheet, and the slant angle of the lenticules relative to the flat panel color display. The interdigitation mapping assumes that the display resolution has a fixed pixel dimension (e.g. 1600×1200 pixels).

The SynthaGram™ is described in further detail in U.S. Pat. No. 6,519,088, "Method and Apparatus for Maximizing the Viewing Zone of a Lenticular Stereogram," and U.S. Pat. No. 6,366,281, "Synthetic Panoramagram, as well as in U.S. Patent Publications 20020036825, "Autostereoscopic Screen" and 20020011969, "Autostereoscopic Pixel Arrangement Techniques," each of which is hereby incorporated by reference.

One challenge with autostereoscopic display in general and the SynthaGramm™ in particular is the accurate processing of the significant quantities of data. Slow processing can materially affect viewing enjoyment, as the timing of motion pictures and pixel information is highly critical to the viewing experience.

It would therefore be beneficial to provide an architecture that can operate in the foregoing environment and rapidly and accurately provides data used in the interdigitation process. Such an architecture may be beneficial in overcoming drawbacks present in previously known systems and having improved functionality over devices exhibiting those negative aspects described herein.

SUMMARY OF THE INVENTION

According to one aspect of the present design, there is provided a method of interdigitation for display of an autostereoscopic source image to a screen comprising a plurality of pixels having sub-pixels and sub-pixel components. The method comprises generating a texture memory coordinate at each pixel location on the screen of the source image, calculating screen pixel location based on the texture memory coordinate of each pixel location, computing view numbers based on screen pixel location, wherein view numbers comprise one value for each sub-pixel component, mapping proportional pixel locations in tiles from multiple tile perspective views of the autostereoscopic image to a resultant image using the view numbers, and extracting one subpixel component from each proportional pixel location to represent color for the pixel in the resultant image.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which:

FIG. 1B is a display area of a digital display monitor having a lenticular sheet thereon;

DETAILED DESCRIPTION OF THE INVENTION

Figure 1A:
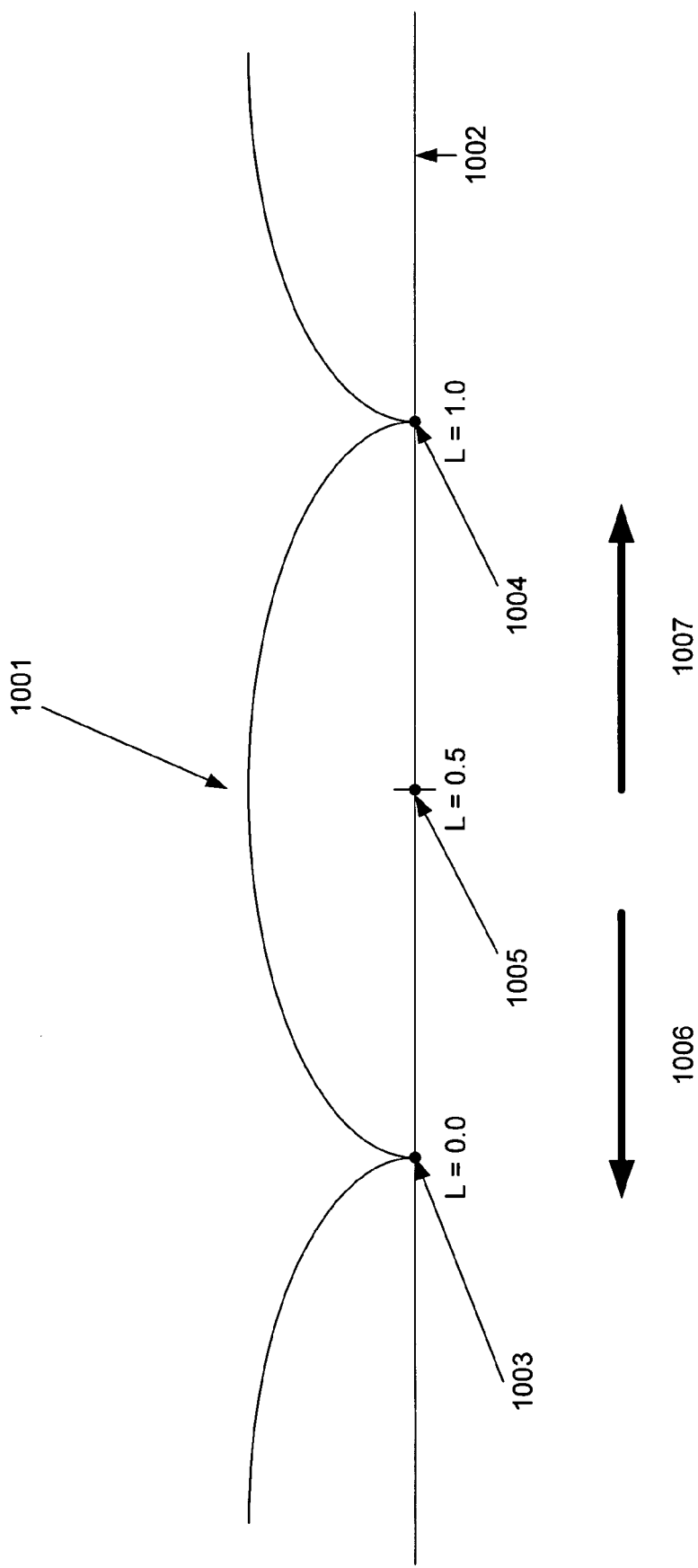
FIG. 1A illustrates the general concept of interdigitation as it relates to interdigitation processing.

The design herein performs stereo view interdigitation using a relatively seamless architecture that can, on-the-fly, adjust to various input conditions and produce interdigitated images suitable for a continuum of viewing distances, operating temperatures, screen alignments and other factors.

The interdigitation calculation can reside at the pixel level, calculated by the graphics hardware's pixel-shader capabilities. Calculation in this manner allows for rapid interdigitation, in a manner that can be highly beneficial for real time autostereoscopic applications, and also permits user and/or software interdigitation parameter changes, such as the lenticular density value, that may need to be adjusted during real time display of autostereoscopic images.

The present architecture may be employed in a device having an integral monitor configuration, where the monitor and the interdigitation unit are together in the same physical unit. A minimum set of user set input parameters may be available in such a unit. One input may control viewing distance, another input the ambient temperature, and another input alignment adjustment, compensating for manufacturing alignment inaccuracies.

Input parameters may be sophisticated, for example a series of thermometers built into the monitor, constantly providing an average temperature for the entire monitor surface. Likewise, a motion detection system (with distance sensors or range finders) may be incorporated to provide a best, averaged distance to the surrounding group of viewers. Alternatively, knobs or controls may be provided, allowing a viewer to dial in the appropriate viewing distance for the monitor.

The input format may vary. The SynthaGram™ system is generally optimized for a nine-tile format, having stereo formats with more or fewer stereo views per frame may be supported. An alternative system for defining stereo views can utilize a single input view plus depth map information. Stereo views may be synthesized from a "depth map" into the present "on-the-fly" architecture.

The interdigitation process that depends on these inputs processes these inputs "on-the-fly", instantaneously reacting to changes in the inputs and producing highly accurate interdigitated results.

The present architecture uses the GPU (graphics processing unit) as a hardware platform for efficiently performing the interdigitation operation. Other custom hardware solutions may be achieved, including but not limited to programmability FGPA architectures and processing an input nine-tile MPEG compressed video stream.

When composing an autostereoscopic image, individual perspective views may be of smaller resolution than the final displayed image. The present design utilizes nine perspective views, but more or fewer views may be used. Nine views are currently employed in the SynthaGram™ system, where individual perspective views can be ⅓ the horizontal and vertical resolution of the final displayed autostereoscopic image with minimal loss of detail. These views are generally stored in a single frame within the SynthaGram™ design in a format referred to as "Nine Tile" or "Nine-Tile."

The aspect ratio of the individual perspective views is not required to be the same as the displayed image. Scaling and centering operations can be used to compose and present an interdigitated image when aspect ratios differ between perspective views.

The nine-tile format can be compressed using industry standard jpeg, mpeg, and other codecs (compression-decompression systems). Ability to compress into these formats is helpful with autostereoscopic content where, were it interdigitated, single pixels often contain information from three separate stereo views in each of the red, green, and blue color channels. Due to the lack of spatial coherency, the precise mapping can be destroyed when codecs are used such as those dependent on block-based compression techniques.

Because the nine-tile format can be compressed, the nine-tile format provides a higher data rate from storage to display. Nine-tile content can be stored and played back on digital storage mediums including disk drives, CDs, and DVDs. A higher data rate allows for smoother playing video and quicker data transfer rates, whether on a single computer or streaming over the Internet.

The nine-tile format provides for SynthaGram™ monitor-invariant content storage. Each monitor, such as a SynthaGram™ monitor, may be defined with a unique set of numbers describing the optics of the lenticular lens sheet employed. These parameters include lenticular density (the number of lenticules per unit distance in a direction perpendicular to the axis of the lenticules; lenticular density is inversely related to lenticular pitch which may be similarly utilized instead), and Winnek angle. The Winnek angle entails the lenticular axis being tipped at an angle (the Winnek angle) relative to the vertical edge of the display, and is employed in the current design. Lenticular boundaries occur at the intersection of the arcs of the lenticular surfaces and the direction of these boundaries, and these boundaries are defined as the "lenticular axis."

An Interzigged (interdigitated) image can only be properly displayed if the image is prepared during the Interzigging process using the specific parameters for the particular monitor. By deferring the Interzigging process and storing the perspective views in the intermediate nine-tile format, no monitor is implied in its definition. Only when the nine-tile format is Interzigged is the resultant format tied to a specific monitor and viewing configuration.

Each monitor, such as a SynthaGramm™ monitor, supports a number of viewing distances at which an Interzigged image can be properly viewed. These viewing distances are defined by unique parameters or a set of numbers. The nine-tile format is typically viewing-distance invariant.

Interdigitation of nine-tile formatted content using graphics hardware occurs as follows. U.S. Patent Publications 20020036825, "Autostereoscopic Screen" and 20020011969, "Autostereoscopic Pixel Arrangement Techniques," both of which are incorporated herein by reference, generally teach that the subpixel interdigitation process can be implemented by a program running on GPUs found on state-of-the-art graphics hardware. GPU cards contain sufficient memory to hold texture blocks and geometry data, perform lighting and texture processing operations, and implement the standard graphics transformations in a pipeline approach. GPU cards are also programmable, allowing for assembly language-like programs to run and perform calculations per geometric vertex (called vertex shaders) and per pixel (called pixel shaders). High-level graphics languages such as DirectX and OpenGL have been enhanced to provide application support for these graphic card features. New higher level languages such as Cg and HLSL also aid in migrating complex algorithms such as interdigitation to the graphics card level without the need for writing code in a low level assembler-like language.

Operating temperature can affect the interdigitation process. The ability to adjust the interdigitation process according to the operating temperature provides the user with a relatively consistent autostereoscopic viewing experience.

The present design addresses the pixel shader component of the interdigitation design, where a pixel shader is a program running in a GPU. A pixel shader (also referred to as a Fragment Shader) is a concise set of assembly language like steps executed at each display pixel. Pixel shaders are typically optimized to process vector data structures in a single operation, allowing all of the subpixel operations for all pixels to be done in parallel, essentially in a single step. To make this happen, the interdigitation computation resides at the pixel context. The present pixel shader implementation runs in a full screen (non-windowed) application, though windowed implementations may be performed as well.

Previous hardware-based interdigitation designs show an implementation of the interdigitation algorithm running as a pixel shader. In such a design, the interdigitation mapping is performed by using two blocks of texture memory in the graphics subsystem, one to reference the perspective views and another to reference the interdigitation mapping. A single quad (two triangles), scaled to fill the display screen, is the only geometry rendered with these two texture memory blocks.

In this traditional implementation, the first texture block, known as the perspective view texture, holds the original nine-tile frame to be interdigitated. The nine-tile frame size is independent of the screen size.

The other texture memory block, known as the mapping texture, is a full screen sized memory block containing a look-up reference or look-up table that defines which perspective view is mapped to each screen subpixel. This mapping texture memory area may also be smaller than the full screen size if a technique referred to as tiling is implemented. Tiling allows the mapping to be repeated in horizontal and vertical directions to fill the screen. The system creates a suitable mapping tile from both a full screen mapping and an acceptable error tolerance.

Interdigitation

In general, the interdigitation model starts with N rendered master images, each image including a grid or array of RGB pixels, meaning that each pixel has a red intensity value, a green intensity value, and a blue intensity value. These N master images can be interdigitated into a single multiple view image including a grid of either distinct RGB pixels, or distinct sub-pixels having a shade of only one primary color (for example, a sub-pixel may be a red-only, green-only, or blue-only portion of a full-color RGB pixel group).

The additive mixture of the RGB sub-pixels, or triad, produces the wide variety of colors which can be displayed on a flat panel monitor. The triad may be spatially arranged in different patterns, as has been demonstrated in various products. Normally, R, G, and B sub-pixels are arranged in side-by-side columns, but other arrangements are possible. For example, the RGB pixels may be arranged with each pixel at the vertex of a triangle, or they may be stacked vertically or horizontally or in various other tessellation patterns. The eye does not care, or perceive any differences, as long as the pixels are in close proximity and the eye is unable to resolve the individual sub-pixels. This optical insensitivity to the normal eye allows rearranging the sub-pixels into various tessellation patterns. This rearrangement, when taken together with the Winnek system of rotating the lenticular screen by angle $\Phi$, enables making the ratio of the horizontal and vertical resolution (pixel count) of the display closely match the screen aspect ratio. However, with sufficiently fine dot pitch, the design may exhibit widely varying resolution ratios relative to the screen aspect ratio. Generally, the overall effect depends on having a sufficiently small sub-pixel dot pitch relative to the lenticular pitch.

The question of which master image(s) should be utilized for obtaining information for a particular interdigitated sub-pixel or pixel depends on where that interdigitated sub-pixel or pixel resides relative to the lenticule that resides above the interdigitated sub-pixel or pixel on the lenticular screen. Also, the question of which sub-pixel or pixel of the applicable master image(s) utilized for specifying or calculating the value of the interdigitated sub-pixel can be addressed by proportionally mapping the master image data to the interdigitated pixel map.

With respect to FIG. 1A, arrow 1006 indicates the direction of right-eye views and arrow 1007 indicates the direction of left-eye views on display surface 1002 which are under and in immediate juxtaposition with lenticule 1001. Lenticule 1001 is a single representative lenticule of a larger lenticular sheet. The position of a distinct sub-pixel or pixel underneath a lenticule 1001 is defined with the value L, where L=0.0 corresponds to point 1003 and puts the center of the sub-pixel or pixel along the left edge of the lenticule; where L=1.0 corresponds to point 1004 and puts it along the right edge of the lenticule; and where L=0.5 corresponds to point 1005 and puts the center of the pixel or sub-pixel mid-lenticule. Then, a relative best fitting master or component image C out of the N master images is given by:

$$C = (1-L) \times (N-1) \qquad (1)$$

where the first master image, numbered 1, represents a far-left-eye view and the last master image, numbered N, represents a far-right-eye view. For example, if N=21 master images, and the center of the sub-pixel being computed resides ⅓ of the way from the left edge to the right edge of the lenticule that sits above the sub-pixel, then the best fitting master image for obtaining that the value of that sub-pixel is (1−0.333)×(21−1), or 13.33, rounded to the nearest integer, namely master image number 13.

In some situations where the number of master images N is relatively small, it may be useful to apply averaging of pixel values from more than one master image. To do this, L, which represents the position of the center of the sub-pixel or pixel relative to the lenticule above the center of the pixel or sub-pixel, is replaced with $L_1$ and $L_2$:

$$L_1 = L - R/2 \qquad (2)$$

$$L_2 = L + R/2 \qquad (3)$$

where R is the horizontal width of the sub-pixel or pixel relative to the horizontal width of the lenticule. Alternatively, R could be set to be smaller or larger than the actual sub-pixel or pixel width. Reducing the R value to a fraction of the actual sub-pixel width results in a more limited pixel averaging, yielding reduced artifacts without the accompanying reduction in sharpness that sometimes occurs with interdigitation based on full-width pixel averaging. Note that if $L_1<0.0$, 1 should be added thereto so that $L_1$ is greater than or equal to 0.0. If $L_2>1.0$, 1 should be subtracted such that $L_2$ is less than or equal to 1.0. Then:

$$C_1 = (1-L_1) \times (N-1) \qquad (4)$$

$$C_2 = (1-L_2) \times (N-1) \qquad (5)$$

For example, if N=21 master images, and the center of the sub-pixel being computed resides ⅓ of the way from the left edge to the right edge of the lenticule that sits above the sub-pixel, and the horizontal width of the sub-pixel is 1/10 of the horizontal width of the lenticule, then L=0.333, R=0.1, $L_1$=0.333−0.05, $L_2$=0.333+0.05, $C_1$=(1−0.283)×20=14.33, and $C_2$=(1−0.383)×20=12.33. Based on this calculation, we have a range from $C_1$ to $C_2$, or from 14.33 down to 12.33 in this example. Such a range indicates a need to apply a weighted average to pixel values obtained from components $C_1$ to $C_2$, or in the example, master images 14, 13 and 12. The appropriate proportional weightings in the example would be as follows:

$$\text{master image } 12 = (12.5-12.33)/(14.33-12.33) = 0.085 \text{ weighting} \qquad (6)$$

$$\text{master image } 13 = (13.5-12.5)/(14.33-12.33) = 0.500 \text{ weighting} \qquad (7)$$

$$\text{master image } 14 = (14.33-13.5)/(14.33-12.33) = 0.415 \text{ weighting} \qquad (8)$$

The question of which pixel(s) from the appropriate master image(s) should be used is determined simply by mapping the desired interdigitated sub-pixel or pixel being calculated to each of the one or more appropriate master image(s). For example, if the calculation above determines that the appropriate master image is image 13, then the pixel value taken from image 13 may be determined by mapping the location of the pixel or sub-pixel in the final to-be-interdigitated image to the coordinates of master image 13. In most cases, the best fitting pixel mapped from each master image may be used, though a weighted average of the values of several pixels that map to the desired range may alternatively be employed.

Depending on the application, the master images may be the same size as the final interdigitated image, or, particularly with real-time applications, where computation performance is important, as described above, the master images may be smaller than the final interdigitated image. In either case, pixels may be mapped proportionally from the appropriate master image(s) to the interdigitated image.

For example, assume that an interdigitated image being calculated has a grid of 4800 sub-pixels horizontally (which would be the case if the horizontal display resolution was 1600 complete RGB pixels, and each of those 1600 pixels consisted of three distinct single-color sub-pixels), and 1024 sub-pixels vertically, and that the master images each have a smaller resolution of 520 pixels horizontally by 340 vertically. To calculate the value of interdigitated sub-pixel (X,Y), the best fitting master image pixel would be (X×520/4800, Y×340/1024), where the lower-left pixel in all cases is (0,0).

The above techniques apply regardless of whether the lenticules are parallel to the pixel columns of the display device or slanted relative to the pixel columns. The only difference between lenticules that are not slanted and lenticules that are slanted is that a slanted lenticule implementation may account for the amount of slant in order to properly calculate the horizontal position L of a pixel relative to the lenticule that is placed above the pixel.

Finally, if the interdigitated sub-pixel being calculated is red-only, green-only, or blue-only, then only the appropriate color element from the master image pixel(s) should be used.

Non-GPU Implementation

The use of the mapping texture memory has proven to be an acceptable solution to performing the interdigitation in the GPU. However, as autostereoscopic monitor designs trend toward higher resolution monitors, the sheer size of the resultant mapping texture memory block becomes an issue. GPUs have limited memory space and storage of a large block of graphics board memory becomes an issue of performance, i.e. mapping and interdigitation can be slow. Most graphic cards today only support memory blocks that are sized in powers of two, increasing the memory needs as well. For example, a new monitor may have a display resolution of 2560×1600. A mapping texture memory block that supports this display is 4096×2048×3 (24 MB). This memory block is needed to render each frame and takes memory space that could otherwise be used for other graphic operations such as scene geometry and appearance-related texture memory blocks.

Calculation of an interdigitation mapping accounts for a number of optical and viewing condition factors. Calculation of an interdigitation mapping also fixes on the number of views interdigitated. The mapping accounts for lenticular linear density (or its reciprocal pitch) and slant. An optimal autostereoscopic monitor viewing distance can be designed by modifying the mapping. Mapping calculations account for these factors and determine the perspective view for display at each subpixel on the screen. Current software processing for creating the mapping, such as using an optimized C++ program, and can take up to 30 seconds to calculate a map, sometimes referred to as a view-map, on a contemporary CPU.

Real-time modification of any of the interdigitation factors can be unsuccessful using current software operating in this architecture on a GPU. Not only does the new mapping need to be computed, but the new mapping also has to be transferred to the graphics card.

The current design implements real time autostereoscopic interdigitation with the ability to adjust all interdigitation properties instantaneously. Interdigitation of perspective views is necessary because of the physical relationship between a display and an adhered lenticular sheet. FIG. 1B shows the display area 101, which is part of a digital display monitor 102. The display area includes an array of scan lines 107. Each scan line consists of a set of precisely positioned pixels 103 each of which is comprised of individually colored subpixels 104. A lenticular sheet 105 with an array of slanted lenticules 106 is precisely attached over the display area 101. The lenticular sheet 105 is designed to be generally the same size as the display area 101.

On any given scan line, a single lenticule 106 covers a non-integer number of subpixels 104. The optical properties of the lenticule cause the emitted light from these covered subpixels to be refracted at different angles towards a viewer. This phenomenon is repeated for all lenticules over all scan lines. The design of the lenticular sheet 105 including the lenticular density (lenticules per inch) and slant angle $\Phi$ 108, representing rotation of the lenticule to the vertical or traditional panoramagram orientation, is optimized such that the calculated interdigitation mapping of perspective views to subpixels allow a complete representation of each perspective view to be projected in space towards a viewer. The viewer is thus able to observe different views in both eyes and perceive a perspective representation.

Figure 2:
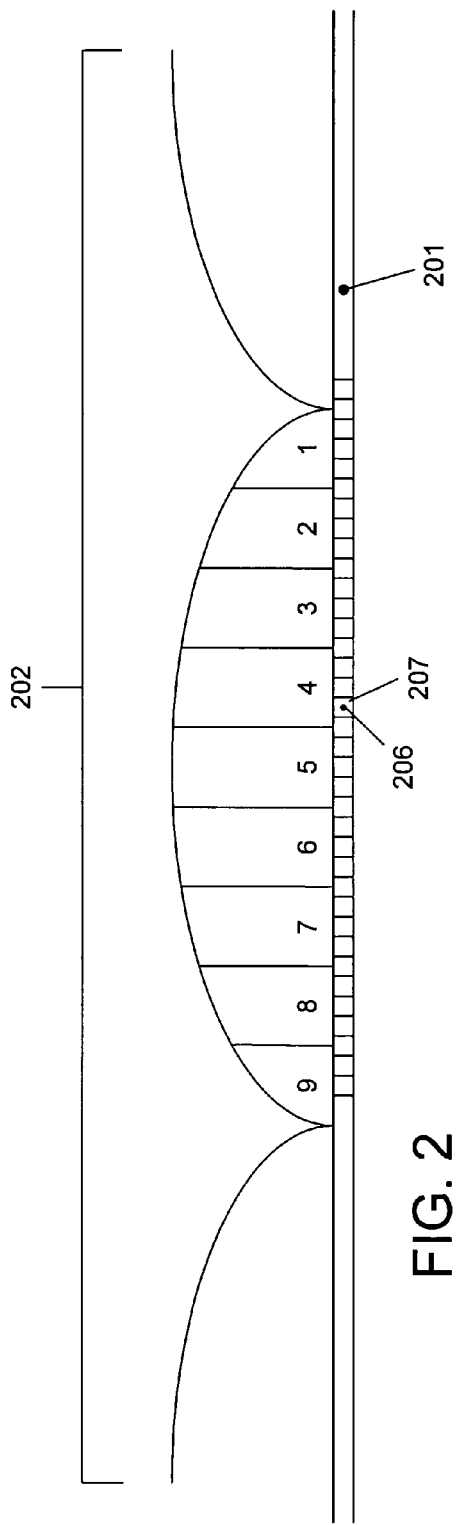
FIG. 2 shows an alternate representation of calculation of interdigitation mapping.

An alternate view of calculation of the interdigitation mapping is shown in FIG. 2. Interdigitation mapping accounts for the position of the subpixels 201 under the array of lenticules 202. The width of a single lenticule is divided in an equal number of sections 203, depending on the number of perspective views to be projected. Each section is assigned a view number 204, representing a reversed order taking into account the refractive properties of the lenticule. For a given subpixel 206 in the display area, the section 203 situated above the subpixel center 207 is identified. The view assigned for that section is then used for the subpixel view assignment. In the drawing, nine perspective views are projected, but more or less views could also be supported.

Figure 3:
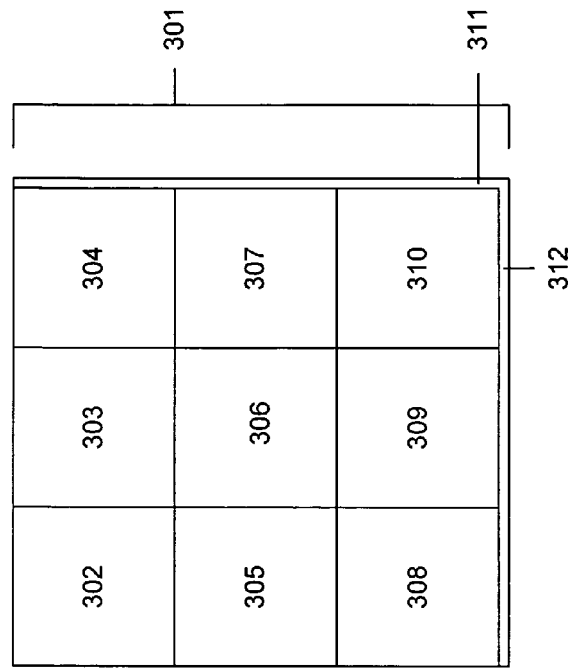
FIG. 3 is a nine tile layout with a single buffer divided into a geometry grid pattern of nine tiles.

For the present system, perspective views are efficiently organized in a non-overlapped fashion, typically onto a single buffer in computer memory. The layout of the perspective views in this buffer can vary widely, but because the standard number is nine views, the current implementation is a layout called "nine-tile". FIG. 3 shows the nine-tile layout where a single buffer 301 is divided into a geometry grid pattern of 9 tiles 302-310. Each tile is ⅓×⅓ the size of the original buffer 301. The tiles are sized with whole pixels, so any unused columns and rows are positioned at the right 311 and bottom 312 of the buffer. The upper left tile 302 contains the leftmost perspective view, the center tile 306 contains the center perspective view and the lower right tile 310 is the rightmost perspective view. The aspect ratio of the buffer 301 closely matches the aspect ratio of each tile 302-310. Although the present design has standardized on nine perspective views as a basis for the autostereoscopic product, it will be clear to those versed in the art that the techniques we describe here are adaptable to other view quantities, and hence other layouts.

Likewise, this system is adaptable to alternative stereo formats that include a single planar view plus depth map information. To support such formats, synthesis of stereo views may be added to the current process.

Pixel Shading

The hardware based interdigitation technique uses an advanced feature of contemporary graphics cards called Pixel Shading (also called Fragment Shading). Pixel Shaders have the same program executed for each screen pixel. If a pixel shader is employed, the nine-tile buffer is stored in a block of graphics board memory normally used for texture data. The size of these texture memory blocks must be at least large enough to hold the nine-tile buffer. Texture memory blocks used in GPUs have usually been required to be allocated in powers of two, but newer graphics cards are not maintaining this restriction. For illustrative purposes, it is assumed that the nine-tile texture memory block dimension is equal to the nine-tile buffer dimension in pixels. The nine-tile buffer dimension can be chosen to be an equal multiple of three so that there are no unused rows and columns in the nine tile buffer.

GPUs must receive the geometry to be rendered in order to display graphics. For the implementation described here, a very simple geometry can be processed in a scene environment with no lighting. A sophisticated scheme that uses texturing may be employed to produce a final interdigitated representation of a nine-tile image.

Figure 4:
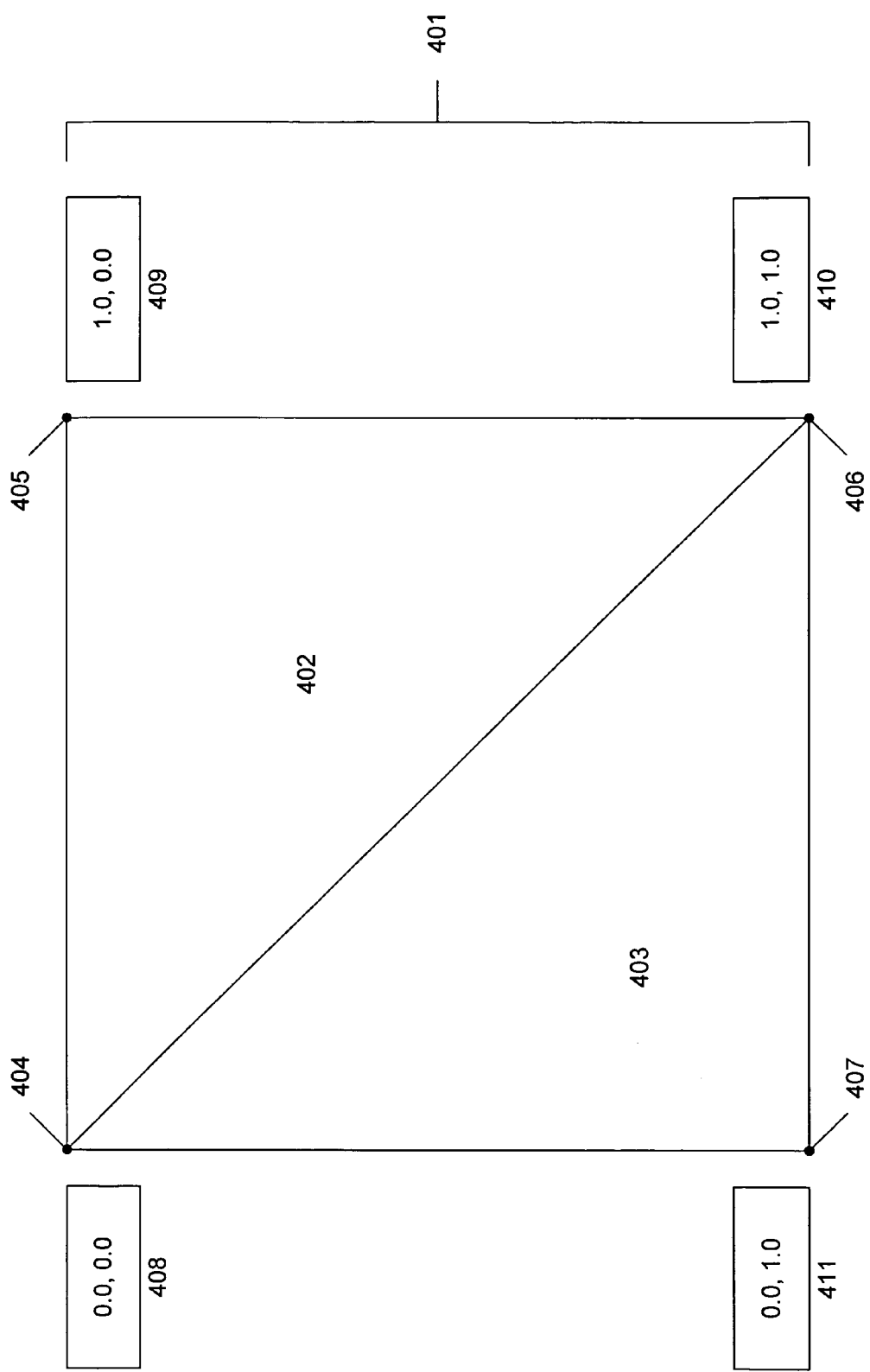
FIG. 4 shows a single geometric entity, such as a defined rectangular region (known as a "quad") that includes two triangles, in the process of being drawn to the screen.

As shown in FIG. 4, a single geometric entity is drawn to the screen. This entity is a rectangular quad 401 including two triangles 402, 403. Triangle 402 has three vertices 404, 405, 406, as does triangle 403 with vertices 404, 406, 407. The triangles share vertices 404, 406 and are oriented counter-clockwise. Each vertex is defined by a single set of UV texture memory block coordinates 408, 409, 410, 411, set to UV values of (0.0,0.0), (1.0,0.0), (1.0,1.0), (0.0,1.0) respectively. As known to those skilled in the art, a UV map is a two dimensional representation of the vertices of a three dimensional model, and UV texture refers to the texture memory representing graphics data between the vertices created in the UV map.

The ability to set a 0 to 1 mapping to the UV values provides an efficient way to normalize the pixel locations in the pixel shader. This UV texture memory coordinate mapping combined with the precise scaling of the rectangular quad to fill the screen enables the pixel shader to determine the location of each pixel in the screen. After the rectangular region is transformed by the GPU hardware, a vertex shader provides the pixel shader with the normalized texture memory block coordinate for each pixel. These texture memory coordinates are converted to screen pixel locations by a multiplication by the known screen width and height.

The generic pixel shader works on all pixels independently and receives as input the texture memory coordinate from the transformed quad, the nine-tile texture memory block, and a set of variables. The list of variables includes the screen width and height, and a set of optical properties of the lenticular array (orientation angle, and pitch or density). The orientation angle is represented as the angle's tangent value and the density is represented as pixels per sublenticular section. The results of the pixel shader are the RGB color at the specific pixel.

Figure 5:
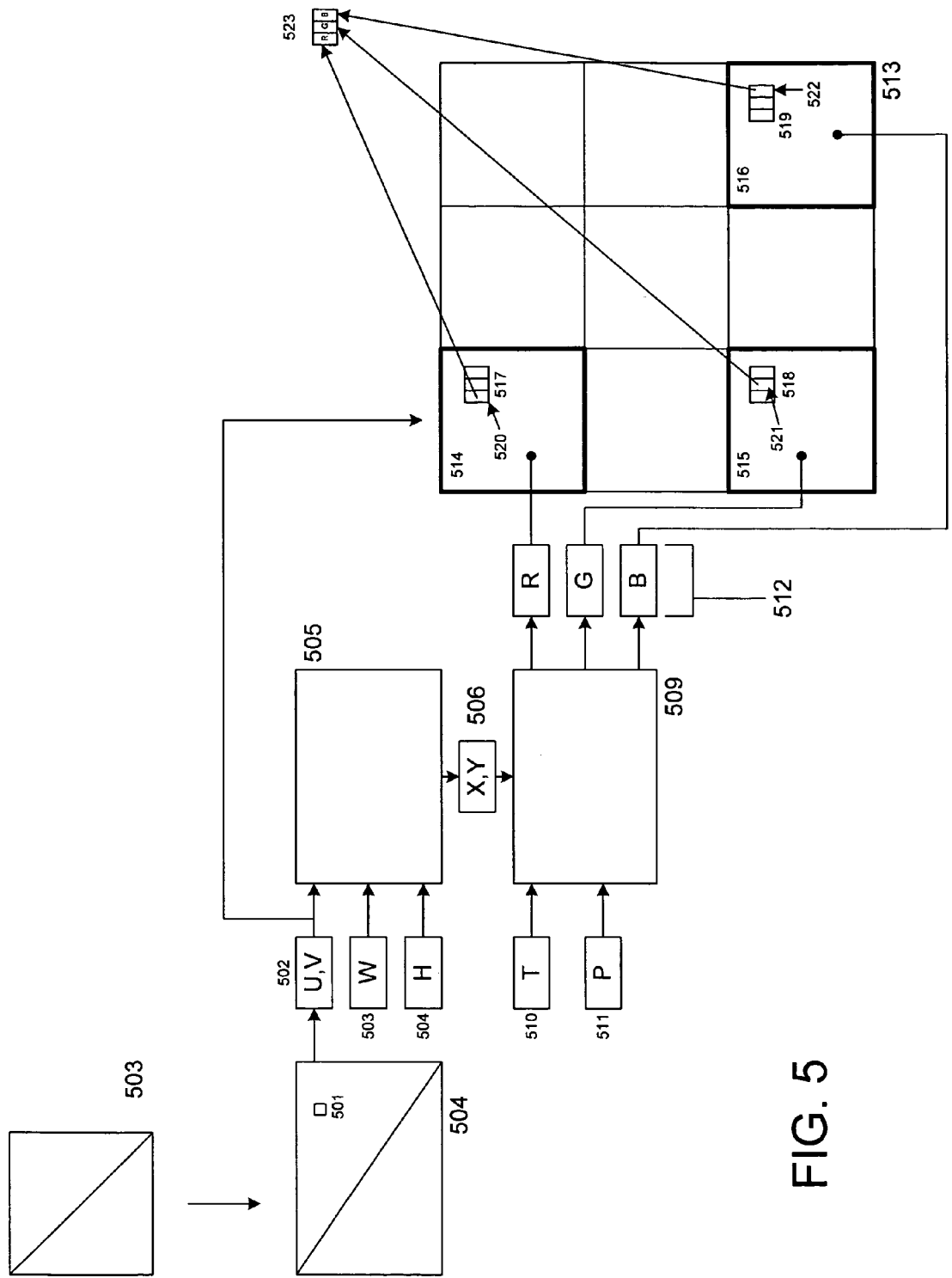
FIG. 5 shows operation of the pixel shader according to the current design.

FIG. 5 shows the operation of the pixel shader. At each pixel location, represented by pixel 501, a UV texture memory coordinate 502 is generated by a rasterization process of a quad geometric entry 503, scaled proportionally to fill the display screen 504. The UV texture coordinate 502, or texture memory coordinate, has a range of U: 0.0 to 1.0 and V: 0.0 to 1.0. The system performs a calculation 505 using inputs UV texture coordinates 502, screen width 507, and screen height 508 to compute the screen pixel location 506 represented by an XY value.

The system performs a second calculation 509 using the screen pixel location 506, the tangent 510, and the density 511 of the lenticular array. This calculation produces a set of 3 view numbers 512 and involves performing the view computation depicted in FIG. 2. The view numbers 512 include one view number for each (RGB) subpixel component.

The system uses the three view numbers 512 to select three tiles 514, 515, 516 in the nine-tile texture 513. Within these three tiles 514, 515, 516, the system uses the UV texture location 502 to find a proportional pixel location in each of the tiles 517, 518, 519. At these three proportional pixel locations 517, 518, 519, a single subpixel component 520, 521, 522 is extracted from each of the pixel locations and used to composite a final output color 523 (in RGB representation) for the pixel. Selection/extraction of the single subpixel component occurs as follows. The system selects the RGB sub-pixel relevant to the target sub-pixel. For example, if the system is calculating qualities for the red sub-pixel that will be drawn to the target pixel on the interdigitated display, the red source sub-pixel (520) would be employed.

The selected tiles need not be unique. The same view may be used to find two of the three RGB subpixel components. The algorithm can be extended to support other view configurations than the nine tile configuration discussed here. The second calculation done at point 509 can be modified to account for the new view non-nine tile arrangement. To define the view arrangement (assuming a grid layout), two new variables may be defined (e.g. VH, VV) that specify the number of views horizontally and the number of views vertically. In the nine-tile layout, these variables are (3,3).

Current pixel shading based interdigitation also enables real time sharpening enhancement. A post-interdigitation sharpening operation can be performed to enhance the final interdigitated image as a second pass rendering. A single sharpening setting can adjust the weights of a sharpening filter and can be interactively altered. All interdigitation parameters (pitch or density, slant, viewing distance) can be adjusted interactively in a similar fashion. Support for post-interdigitation filter may be added to the architecture of a pixel shader with multiple pass rendering.

As sharpening algorithms may be implemented at the pixel shader level, a sharpening algorithm may be applied that works differently along horizontal and vertical axes, since the mostly vertical lenticular axis results in differing optical characteristics when applied in both horizontal and vertical directions.

Scaling Methods

In the present pixel shader implementation, tile scaling occurs in the GPU with the same efficient implementation used for texture scaling. An alternative scaling approach can enhance results by using different calculations in the horizontal and vertical scale directions Normally, the source-view images each are scaled upward so that they are the same size as the display screen. It is typical (though not necessary) for a nine-tile grid of source-view images to have total dimensions the same or roughly similar to the dimensions of the final interdigitated output. For example, an interdigitated output size of 1280×1024 pixels might have use a nine-tile source with combined dimensions of 1278×1023, of which each of the nine source-views has the dimensions 426×341. In this example, illustrating a typical implementation, the source-view images are scaled upward by a factor of slightly more than three, in both horizontal and vertical dimensions.

While the amount of scaling is typically the same or similar in both the horizontal and vertical dimensions, the nature of how the scaling may be perceived is somewhat different in each of the two dimensions. Perception differences result from the fact that the lenticular axis is much closer to vertical than horizontal. Thus, sharper and more precise scaling is most useful in the vertical dimension, while a more aliased scaling is desired in the horizontal dimension. To this end, the present design employs an enhanced scaling algorithm different in the horizontal dimension than the vertical dimension. The enhanced scaling algorithm can improve visual quality and reduce some undesirable interdigitation artifacts while maintaining good sharpness.

The enhanced scaling technique or algorithm uses simple selection based scaling in the vertical dimension while using a linear-filtered scaling in the horizontal dimension. This approach to scaling pre-interdigitated source-views may be followed using any interdigitation method. Using different scaling algorithms for horizontal and vertical scaling (linear-filtered horizontally, selection-based vertically) can result in better quality autostereoscopic graphics.

For the purpose of describing the enhanced scaling algorithm, the dimensions of the interdigitated output are ($W_o$, $H_o$), and the dimensions of each source-view image ($W_s$,$H_s$). The amount by which each source-view is scaled up is $W_o/W_s$ in the horizontal dimension and $H_o/H_s$ in the vertical dimension. The present design can map of the desired source-view bitmap to the interdigitated bitmap using simple selection scaling using an equation such as the following:

$$x_s = \text{truncate to greatest integer of } ((x_o+0.5)/(W_o/W_s)) \quad (9)$$

$$y_s = \text{truncate to greatest integer of } ((y_o+0.5)/(H_o/H_s)) \quad (10)$$

where ($x_o$,$y_o$) is the pixel location of the sub-pixel being calculated, relative to the origin of the output interdigitated image. ($x_s$,$y_s$) is the pixel location of the appropriate source-view image sub-pixel from which to select image data, relative to the origin of the appropriate particular source-view image, given the output pixel's position beneath the lenticular column above the output pixel. The system applies Equations (9) and (10) by allowing the output sub-pixel being calculated, whose pixel location is ($x_o$,$y_o$), take on the value of the matching sub-pixel at source-view image pixel location ($x_s$, $y_s$). Sub-pixels are generally sourced separately because each sub-pixel of a particular pixel typically draws information or data from a different source-view image, i.e. a different image in the nine tile configuration.

The present design performs enhanced scaling that achieves simple selection scaling in the vertical dimension and linear-filtered scaling in the horizontal dimension using Equations (9) and (10), but would modify the calculation of $x_s$ as follows:

$$\text{if } (x_s \bmod 3 = 0) \text{ then } x_{s2} = x_s - 1 \quad (11)$$

$$\text{if } (x_s \bmod 3 = 1) \text{ then } x_{s2} = x_s \quad (12)$$

$$\text{if } (x_s \bmod 3 = 2) \text{ then } x_{s2} = x_s + 1 \quad (13)$$

where 'mod' indicates the modulo function, representing the remainder of integer division. For example, $x_s \bmod 3 = 0$ means that $x_s$ is evenly divisible by 3. Note that pixels along bitmap edges need to be treated specially. For far-left and far-right pixels on each row, the present design may always let $x_{s2} = x_s$. In the enhanced scaling algorithm, the output sub-pixel being calculated at pixel location ($x_o$,$y_o$) takes a weighted average of the values of two different sub-pixels:

$$\text{value of } (x_o,y_o) \text{ sub-pixel} = (2*(\text{value of}(x_s,y_s) \text{ sub-pixel}) + (\text{value of } (x_{s2},y_{s2}) \text{ sub-pixel}))/3 \quad (14)$$

Pixel shaders typically only allow a single texture filtering value. The present scaling algorithm is a hybrid between a nearest point sampling and a linear filter setting. Hence this enhanced scaling algorithm is implemented in the GPU by explicitly and somewhat inefficiently performing the calculations within the pixel shader. However, if an alternative (non-GPU) hardware implementation is employed, such a scaling algorithm can be applied without the need to address an external component. Current pixel shaders employ vector data structures. Rather than a coding a separate computation for each RGB component, the present design may employ an optimized version of the pixel shader that calculates all three values simultaneously using a single vector variable to store values for all color components. One example of such an optimized software based pixel shader is in the following code example, written in HLSL:

float4 ninetilerow;

float4 ninetilecol;

int4 view;

:

ninetilerow=floor(view/3)+IN.texture0.y;

ninetilecol=floor(view%3)+IN.texture0.x;

Here, the values "view," "ninetilerow" and "ninetilecol" contain three values each for red, green, and blue computation. A fourth value in each of these variables goes unused. The value IN.texture0 represents the quad's UV texture, in both X and Y dimensions, and the "%" value here represents the "mod" function discussed above.

If the computation capacity of the pixel shading capability has limitations such that application of horizontal filtering using the above method is not possible, a simpler filtering algorithm may be applied to add some averaging or smoothing along the horizontal axis. For example, the ($x_s \bmod 3$) calculation test may be omitted, and a partial blending could be applied to horizontally adjacent source pixels when scaling.

Other Considerations

In this architecture, the interdigitated results are calculated using input variables including the lenticular array tangent and density (or its reciprocal, pitch). To produce a different interdigitation, the value of the input variables may be changed once they are received or before they are received. Generally the pixel shader program, width/height input variables, the nine-tile texture, and the quad geometry are unchanged. However, frequent changes to the lenticular pitch or density may be useful in certain circumstances to account for varying viewing distances based on real time tracking of user position, changing display temperature properties, other configuration changes, and/or other factors. In current computer hardware implementations and contemporary graphic cards, input variable changes can occur relatively frequently, such as over 100 times per second. Allowing for the input variables to change can enable a relatively instantaneous interdigitation solution with good overall performance.

Figure 6:
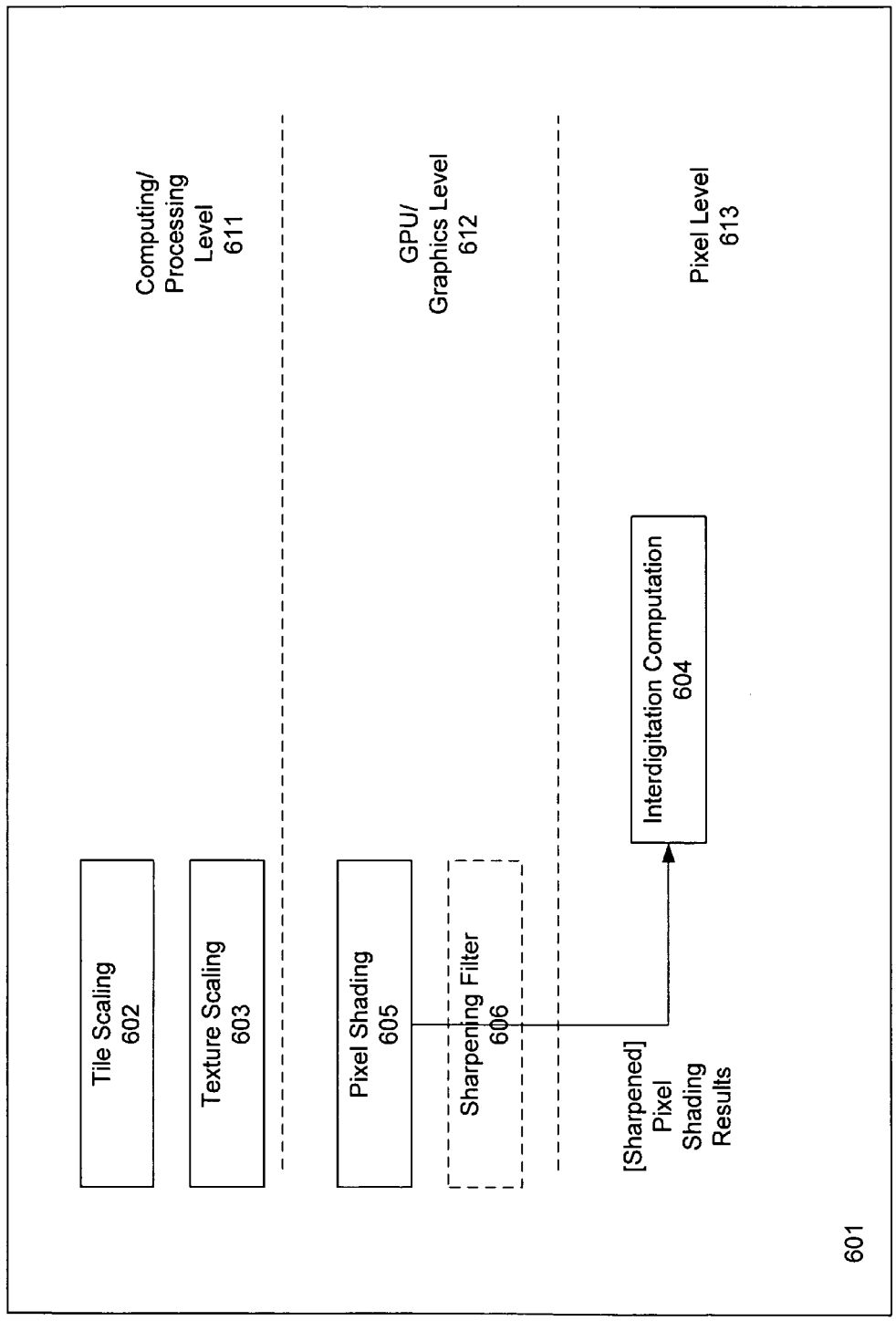
FIG. 6 represents a general architectural overview of a computer or computing device performing the functionality described herein.

FIG. 6 illustrates one embodiment of a computer or computational device 601, having an architecture that may be used to perform the specific functionality described herein.

Interdigitation, scaling, and sharpening may be done at the computer processing or CPU level 611 (typically utilizing iterative programming structures), or some or all of these processes may utilize the graphics processor level 612 or GPU, graphics processing unit. The GPU provides an interface between the CPU and display and can take over certain tasks that the CPU would otherwise perform at a slower rate. Some of the processes discussed herein, such as pixel masking, may use GPU functionality. Alternately, some or nearly all of this processing may be moved to the pixel level 613, one possible implementation of which uses the graphics hardware's or GPU's pixel shading capabilities, such as providing programmable processing power with each pixel to enable parallel processed pixel-related or pixel level computation capabilities. In other words, pixel shading is one possible implementation of GPU functionality that can assign programmable processing power to each and every individual pixel.

Computing/processing level 611 thus differs from graphics level 612 and pixel level 613. As shown, tile scaling 602 and texture scaling 603 may occur at the computing/processing level 611. Interdigitation may be computed as shown by interdigitation computation element 604 at the pixel level 613, the interdigitation computation 604 using the graphics level 612 and/or subsystem's pixel shading processing capabilities, shown by point 605. Alternately, interdigitation may be computed at another level or may be computed at two or more levels, where portions of the computation occur on one level and other computations on another level.

The benefit of using pixel shading, or other graphics hardware functions that allow programmable pixel-based computation, is greater processing speed. Such better performance is often highly beneficial for applications that receive user input in real time. Additionally, pixel-based interdigitation allows very quick response to changing interdigitation parameters, such as occasionally or continuously changing lenticular density or pitch value, to allow for variable viewing distance, display temperature variation, and so forth.

The system may also utilize different scaling algorithms for horizontal and vertical scaling for the purpose of improving autostereoscopic quality. More specifically, the system may use linear filtered scaling in the horizontal direction while using selection scaling in the vertical direction. While scaling algorithms may be implemented using the CPU and GPU, better performance may be realized by applying the parallel processing capabilities of pixel shading, or other parallel graphics processing functions that assign programmable processing capabilities to each pixel. Scaling functions may be tightly integrated with the pixel shading code that is used to perform the interdigitation such that scaling and pixel shading together produce enhanced results, and processing using the pixel shader can provide results faster than previously achieved.

Another component that may be provided is a sharpening filter that works differently in the horizontal and vertical directions. Such a sharpening filter 606, shown as an optional component in FIG. 6 at the graphics level 612, can enhance autostereoscopic image quality. A sharpening filter can be provided that is only applied in the horizontal direction. Note that while shown in the graphics level 612 in FIG. 6, the sharpening filter, and generally any component discussed herein, may be provided at another level. Further, certain functionality may be combined or distributed among components, such as employing a sharpening filter in the pixel shading computation.

In operation, the system may start with pre-interdigitaion sharpening, then perform scaling, then interdigitation, and finally post-interdigitation sharpening. In a typical scenario, one sharpening process may occur, not both pre-interdigitation and post-interdigitation sharpening, typically due to time constraints. These functions had typically occurred slowly, entirely in the CPU, with the resulting image or images or bitmap then passing to the graphics level or subsystem. In the current design, the CPU is still involved, but the system offloads as much graphical processing as possible into the pixel shading function.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method of interdigitation for display of an autostereoscopic source image to a screen comprising a plurality of pixels having sub-pixels and sub-pixel components, comprising:

generating a texture memory coordinate at each pixel location on the screen of the source image;

calculating screen pixel location based on the texture memory coordinate of each pixel location;

computing view numbers based on screen pixel location, wherein view numbers comprise one value for each sub-pixel component; and extracting one subpixel component from each proportional pixel location to represent color for the pixel in a resultant image;

wherein said extracting occurs at a pixel level separate from a processing level and a graphics level.

2. The method of claim 1, wherein the computing comprises:

specifying desired horizontal and vertical dimensional resultant values; and scaling the source image based on the desired horizontal and vertical dimensional resultant values.

3. The method of claim 2, wherein said scaling comprises linear filtered scaling in at least one dimension.

4. The method of claim 2, wherein the scaling employs a weighted average of at least two different sub-pixels.

5. The method of claim 1, wherein said extracting comprises selecting one subpixel component from each proportional pixel location and using a single vector to represent all color components of the pixel.

6. The method of claim 1, wherein the mapping employs input variables including at least one particular Winnek angle.

7. The method of claim 1, wherein the mapping employs input variables including pitch/density.

8. A method of mapping a source image into a resultant autostereoscopic image, comprising:

computing view numbers based on locations of pixels on a screen where the resultant autostereoscopic image is to be displayed, wherein view numbers comprise one value for each sub-pixel component of the source image;

mapping pixel locations from multiple perspective views of the source image to the resultant autostereoscopic image using the view numbers; and extracting one subpixel component from each pixel location to represent color for the pixel in the resultant image;

wherein said mapping occurs at a pixel level separate from a processing level and a graphics level.

9. The method of claim 8, further comprising:

generating a texture memory coordinate at each pixel location on the screen of the source image;

calculating pixel location based on the texture memory coordinate of each pixel;

wherein said generating and calculating precede computing view numbers.

10. The method of claim 8, wherein the computing comprises:

specifying desired horizontal and vertical dimensional resultant values; and scaling the source image based on the desired horizontal and vertical dimensional resultant values.

11. The method of claim 10, wherein said scaling comprises linear filtered scaling in at least one dimension.

12. The method of claim 10, wherein the scaling employs a weighted average of at least two different sub-pixels.

13. The method of claim 8, wherein said extracting comprises selecting one subpixel component from each proportional pixel location and using a single vector to represent all color components of the pixel.

14. The method of claim 8, wherein the mapping employs input variables including lenticular array tangent.

15. The method of claim 8, wherein the mapping employs input variables including pitch/density.

16. An apparatus for interdigitizing an autostereoscopic source image to a screen comprising a plurality of pixels having sub-pixels and sub-pixel components, comprising:

a computer configured to:

generate a texture memory coordinate at each pixel location on the screen of the source image;

calculate screen pixel location based on the texture memory coordinate of each pixel;

compute view numbers based on screen pixel location, wherein view numbers comprise one value for each sub-pixel component; and extract one subpixel component from each proportional pixel location to represent color for the pixel in a resultant image;

wherein said view number computing and subpixel component extracting occurs at a pixel level separate from a processing level and a graphics level.

17. The apparatus of claim 16, wherein the computing comprises:

specifying desired horizontal and vertical dimensional resultant values; and scaling the source image based on the desired horizontal and vertical dimensional resultant values.

18. The apparatus of claim 17, wherein said scaling comprises linear filtered scaling in at least one dimension.

19. The apparatus of claim 17, wherein the scaling employs a weighted average of at least two different sub-pixels.

20. The apparatus of claim 16, wherein said extracting comprises selecting one subpixel component from each proportional pixel location and using a single vector to represent all color components of the pixel.

21. The apparatus of claim 16, wherein the mapping employs input variables including lenticular array tangent.

22. The apparatus of claim 16, wherein the mapping employs input variables including pitch/density.

23. A method of mapping a source image into a resultant autostereoscopic image, comprising:

scaling the source image to form a scaled image;

pixel shading the scaled image to form a pixel shaded image; and mapping pixel locations from multiple perspective views of the shaded image to the resultant autostereoscopic image, said mapping occurring at a pixel level of a computing device, the pixel level separate from a processing level and a graphics level.

24. The method of claim 23, further comprising responding in real time to changing lenticular pitch/density in parallel with the pixel shading.

25. The method of claim 23, wherein the scaling comprises utilizing different scaling algorithms for horizontal and vertical scaling.

26. The method of claim 25, wherein utilizing different scaling algorithms for horizontal and vertical scaling comprises using linear filtered scaling horizontally while using selection scaling vertically.

27. The method of claim 25, further comprising sharpening the resultant image using a sharpening filter that works differently in a horizontal direction and a vertical direction.

28. The method of claim 27, wherein sharpening is only applied in the horizontal direction.

29. The method of claim 23, further comprising averaging pixel values from the source image using horizontal width of at least a portion of a pixel relative to a horizontal width of a lenticule used to display the resultant autostereoscopic image.

30. The method of claim 29, wherein the horizontal width differs from the width of at least a portion of the pixel.

* * * * *